(12) United States Patent
Shingu et al.

(10) Patent No.: US 8,126,271 B2
(45) Date of Patent: Feb. 28, 2012

(54) INFORMATION PROCESSING APPARATUS, REMOTE INDICATION SYSTEM, AND COMPUTER READABLE RECORDING MEDIUM

(75) Inventors: Jun Shingu, Tokyo (JP); Tetsuo Iyoda, Kanagawa (JP); Hiroyuki Miyake, Kanagawa (JP); Kentaro Takano, Kanagawa (JP); Kei Tanaka, Kanagawa (JP); Takeshi Chiba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 897 days.

(21) Appl. No.: 12/172,405

(22) Filed: Jul. 14, 2008

(65) Prior Publication Data

US 2009/0097755 A1 Apr. 16, 2009

(30) Foreign Application Priority Data

Oct. 10, 2007 (JP) ................................. 2007-264364

(51) Int. Cl.
*G06K 9/34* (2006.01)
*G06K 9/00* (2006.01)
(52) U.S. Cl. ........................................ 382/180; 382/115
(58) Field of Classification Search .................. 382/115, 382/180, 181, 209, 224, 284, 100
See application file for complete search history.

(56) References Cited

U.S. PATENT DOCUMENTS

| 5,568,279 | A  | * | 10/1996 | Hinman et al. ............... 358/452 |
| 6,219,057 | B1 | * | 4/2001 | Carey et al. .................... 345/419 |
| 7,164,811 | B2 | * | 1/2007 | Nathanson et al. ........... 382/313 |
| 7,679,643 | B2 | * | 3/2010 | Shingu ..................... 348/207.11 |
| 2004/0070674 | A1 |  | 4/2004 | Foote et al. |
| 2007/0273837 | A1 | * | 11/2007 | Furui ............................. 353/31 |

FOREIGN PATENT DOCUMENTS

JP 2005-33756 A 2/2005

* cited by examiner

*Primary Examiner* — Daniel Mariam
(74) *Attorney, Agent, or Firm* — Sughrue Mion, PLLC

(57) ABSTRACT

An information processing apparatus includes an acquiring portion, a deciding portion, a controlling portion, a determining portion, and a transmitting portion. The acquiring portion acquires attribute information of an object. The deciding portion decides identification information of a user accessible to the object, based on a database associated with attribute information of each object and identification information of a user accessible to each object, and the acquired attribute information. The controlling portion decides a capture area including the object, and causes a projecting device to project a capture area. The determining portion determines whether a user of a remote terminal is accessible to the object based on identification information from the remote terminal and the decided identification information. The transmitting portion transmits a captured image of the decided capture area to the remote terminal when the user of the remote terminal is accessible to the object.

10 Claims, 8 Drawing Sheets

FIG. 3

| OBJECT ID | MODEL NUMBER OF OBJECT | USER ID | BAR-CODE | TEMPLATE IMAGE | FRAME COLOR | SIZE OF OBJECT (LENGTH x BREADTH x HEIGHT) |
|---|---|---|---|---|---|---|
| A001 | 000001 | 001,002,003 004,005 | ||||||||||||||| | ⌭ | RED | 300x300x100 |
| A002 | 102030 | 001-003 010,015 | ||||||||||||||| | ▱ | GREEN | 80x300x80 |
| A003 | 000523 | 001-005, 011-012 | ||||||||||||||| | ⬡ | BLUE | 60x30x0 |
| ⋮ | ⋮ | ⋮ | ⋮ | ⋮ | ⋮ | ⋮ |

INFORMATION PROCESSING APPARATUS, REMOTE INDICATION SYSTEM, AND COMPUTER READABLE RECORDING MEDIUM

CROSS-REFERENCE TO RELATED APPLICATION

This application is based on and claims priority under 35 USC 119 from Japanese Patent Application No. 2007-264364 filed Oct. 10, 2007.

BACKGROUND

1. Technical Field

The present invention relates to an information processing apparatus, a remote indication system, and a computer readable recording medium.

2. Related Art

There have been known remote indication systems, each of the remote indication systems including a server (e.g. a computer) connected to a video camera and a projector, and a remote client (e.g. a computer) connected to the server via a network.

SUMMARY

According to an aspect of the invention, there is provided an information processing apparatus that is connected to a projecting device that projects an annotation image transmitted from a remote terminal onto a projection area including an object, and an image capture device that captures the projection area, including: an acquiring portion that acquires attribute information of the object; a deciding portion that decides identification information of a user accessible to the object, based on a database associated with attribute information of each object and identification information of a user accessible to each object, and the acquired attribute information of the object; a controlling portion that decides a capture area including the object, and causes the projecting device to project the capture area; a determining portion that determines whether a user of the remote terminal is accessible to the object based on identification information of the user from the remote terminal and the identification information of the user decided by the deciding portion; and a transmitting portion that transmits a captured image of the decided capture area to the remote terminal when it is determined that the user of the remote terminal is accessible to the object.

BRIEF DESCRIPTION OF THE DRAWINGS

Exemplary embodiments of the present invention will be described in detail based on the following figures, wherein:

FIG. 2 is a block diagram showing the functional structures of a PC 1 and a PC 2a;

FIG. 3 is a block diagram showing an example of a database stored in a memory 103;

DETAILED DESCRIPTION

A description will now be given, with reference to the accompanying drawings, of an exemplary embodiment of the present invention.

Figure 1:
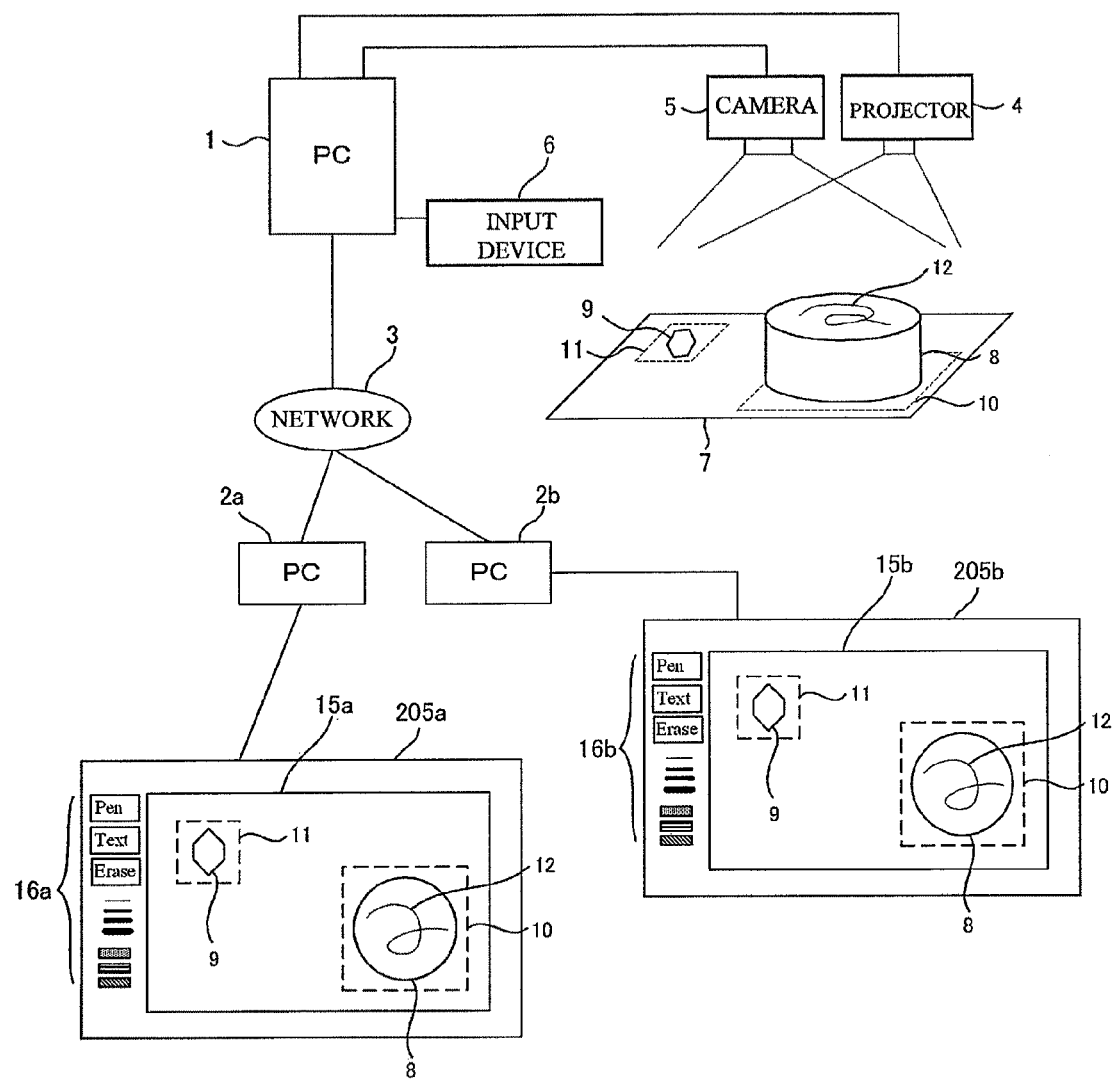
FIG. 1 is a diagram showing the structure of a remote indication system that includes an information processing apparatus in accordance with an exemplary embodiment of the present invention.

FIG. 1 is a diagram showing the structure of a remote indication system that includes an information processing apparatus in accordance with the exemplary embodiment of the present invention.

The remote indication system in FIG. 1 includes a personal computer (PC) 1 (the information processing apparatus) functioning as a server, and PCs 2a and 2b (remote terminals) functioning as clients. The PC 1 and the PCs 2a and 2b are connected to each other via a network 3. A projector 4 (a projecting device), a camera 5 (an image capture device), and an input device are connected to the PC 1. The projector 4 projects an annotation image 12 onto a table 7, and objects 8 and 9 based on a control command from the PC 1. Further, the projector 4 projects a whole black image onto a table 7, and objects 8 and 9 in an initial state. It should be noted that the annotation image includes an image of any types such as a line, a character, a symbol, a figure, a color, and a font.

The projector 4 and the camera 5 are adjusted so that these angles of view mutually become the same. The camera 5 captures reflected images of the table 7 including the objects 8 and 9 at predetermined time intervals (e.g. 0.1 seconds), and outputs the captured image to the PC 1. The input device 6 is a device for inputting attribute information of the objects 8 and 9 (e.g. IDs of the objects 8 and 9, model numbers of the objects 8 and 9, and the like) to the PC 1. The input attribute information is certified by the PC 1. The input device 6 includes a keyboard or mouse for manually inputting the attribute information of the objects 8 and 9, a bar-code reader for reading a bar-code including the attribute information of the objects 8 and 9, a RFID reader for reading a RFID tag including the attribute information of the objects 8 and 9, and the like.

The PC 1 outputs the image captured by the camera 5 to the PC 2a and/or the PC 2b via the network 3. The PC 2a is connected to a display 205a, and the display 205a displays a display area 15a of the captured image, and a user interface (UI) 16. The PC 2 may be a personal computer that is integrated with the display 205a. It should be noted that the PC 2b has the same structure as the PC 2a, and therefore a description will be mainly given of the PC 2a. When the structures of the PCs 2a and 2b are distinguished from each other, a subscript "a" or "b" is added to a reference number of each element.

The UI 16a includes a group of buttons such as a pen button, a text button, and an erase button, and icons defined by lines and colors. The image captured by the camera 5 is displayed in the display area 12. In FIG. 1, the image of the table 10 including the objects 8 and 9 that is captured by the camera 5 is displayed in the display area 15a.

For example, when the pen button of the UI 16a is pressed to draw a figure or the like on the object 8 in the display area 15a, the information about the figure (specifically, the coordinates (x, y) representing the figure in the display area 15a) is output from the PC 2a to the PC 1. The PC 1 then converts the figure information to the information represented by the coordinates of the projector 4, and outputs the coordinate information to the projector 4. The projector 4 projects the figure onto the object 8 based on the converted information about the figure. Since the captured image is displayed in the display area 15*a* of the display unit 205*a*, the coordinates (x, y) in the captured image are identical with the coordinates (x, y) in the display area 15*a*.

Meanwhile, the PC 2 outputs control commands to the PC 1, so as to control operations of the projector 4 and the camera 5 (e.g. the capture angles and the brightness of images captured by the camera 5, the rightness of images projected by the projector 4, and the like).

The projector 4 may be connected to the PC 1, and the camera 5 may be connected to some other PC (not shown). In such a case, each image captured by the camera 5 is output to the PC 2*a* or the PC 2*b* via the other PC.

Figure 2:
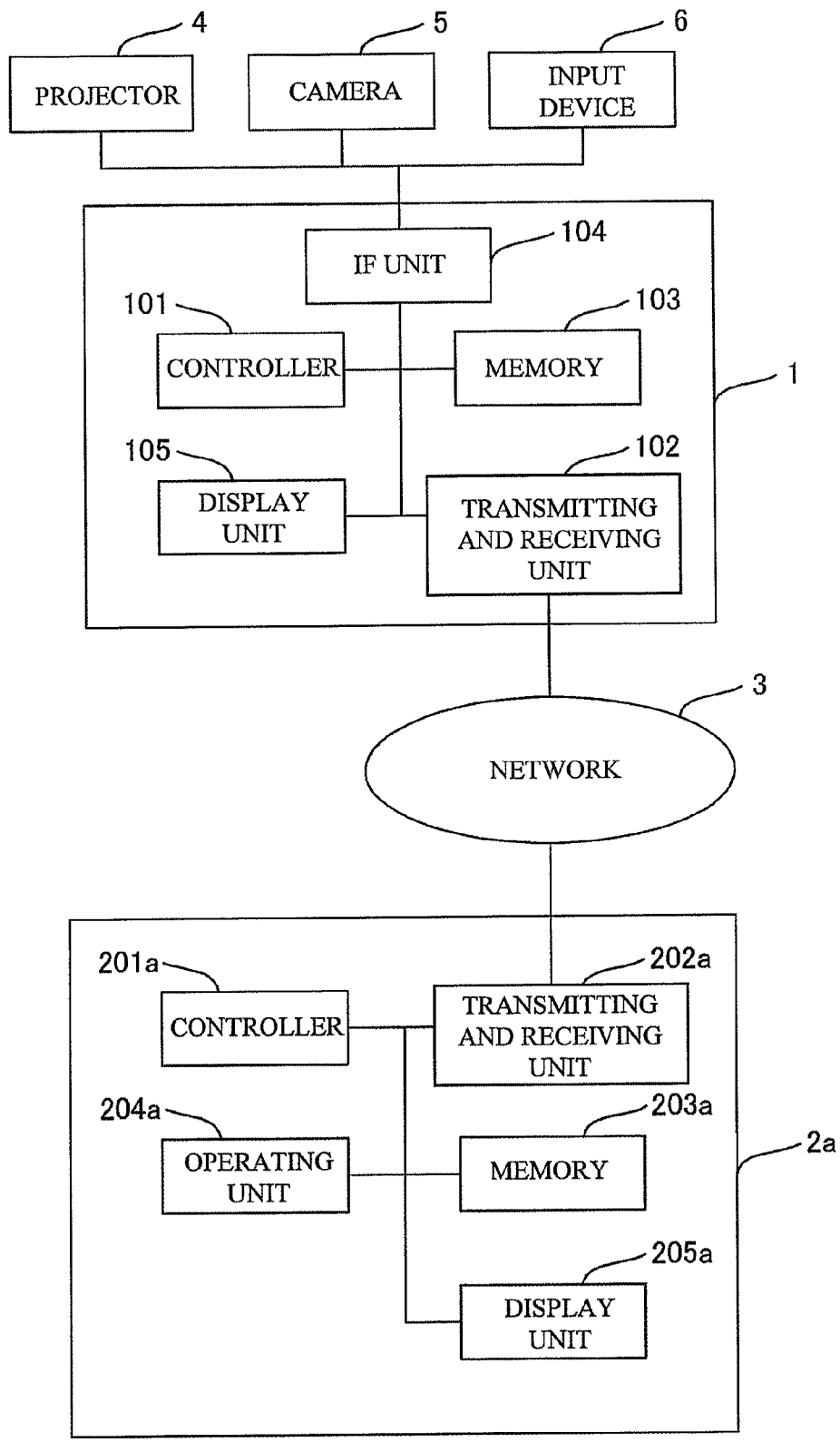

FIG. 2 is a block diagram showing the functional structures of the PC 1 and the PC 2*a*.

The PC 1 includes: a controller 101 (an acquiring portion, a deciding portion, a controlling portion, a determining portion, and a transmitting portion) that controls operations of the projector 4, the camera 5, and the input device 6, as well as the entire device; a transmitting and receiving unit 102 (the transmitting portion) that exchanges information and data with the PC 2 via the network 3; a memory 103 that stores control programs, data, information, and the likes; an interface unit 104 (the acquiring portion) that connects the projector 4 and the camera 5; and a display unit 105 that displays information input to the PC 1 via the input device 6 and the captured image. The controller 101 is connected to the transmitting and receiving unit 102, the memory 103, the interface unit 104, and the display unit 105. The controller 101 is further connected to the projector 4, the camera 5, and the input device 6 via the interface unit 104.

The memory 103 is provided with a database shown in FIG. 3. The database includes attribute information of each object, and more specifically, data which has an ID of the object, a model number of the object, a user ID of a remote terminal (i.e., the PC 2*a* or the PC 2*b*) accessible to the object, a bar-code, a template image of the object, a color of a frame designating the capture area, and a size of the object. The database further may include data of RFID and CAD (Computer Aided Design).

The PC 2*a* includes: a controller 201*a* that controls the entire device; a transmitting and receiving unit 202*a* that exchanges information and data with the PC 1 via the network 3; a memory 203*a* that stores controls programs, data, information, and the likes; an operating unit 204*a* that is formed with a mouse, a keyboard, and the likes; and a display unit 205*a*. The controller 201*a* is connected to the transmitting and receiving unit 202*a*, the memory 203*a*, the operating unit 204*a*, and the display 205*a*. It should be noted that the structure of the PC 2*b* is the same as that of the PC 2*a*, and therefore a description thereof is omitted.

Figure 4:
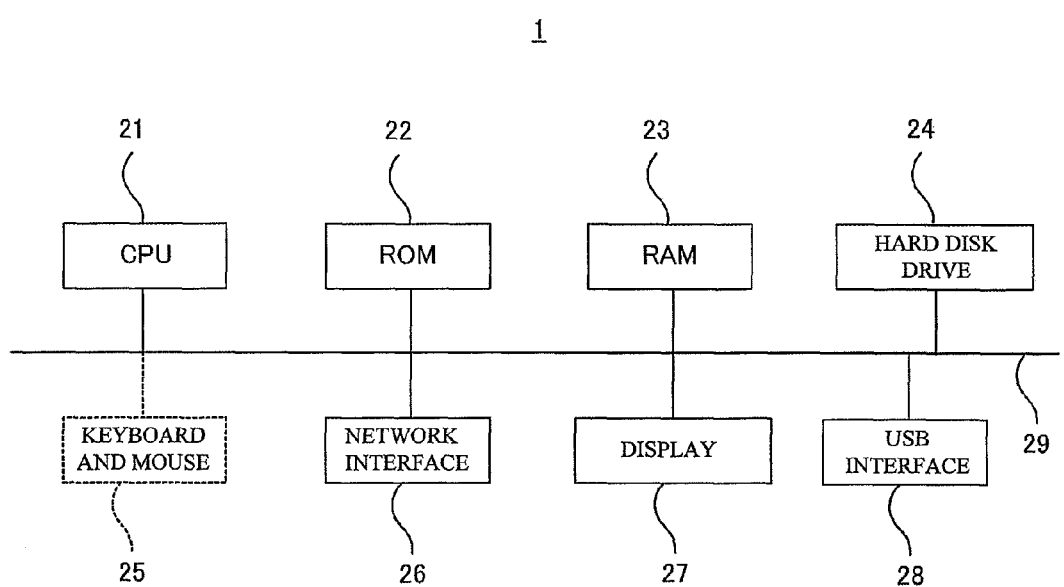
FIG. 4 is a block diagram showing the hardware structure of the PC 1.

FIG. 4 is a block diagram showing the hardware structure of the PC 1.

The PC 1 includes: a CPU 21 that controls the entire device; a ROM 22 that stores control programs; a RAM 22 that functions as a working area; a hard disk drive (HDD) 24 that stores various kinds of information, programs, and databases; a network interface 26 that connects to another computer; a display 27 that is formed with a liquid crystal monitor or a CRT; and a USB (universal serial bus) interface 28 that connects to a USB device (not shown). The CPU 21 is connected to the ROM 22, the RAM 23, the hard disk drive (HDD) 24, the network interface 26, the display 27, and the USB interface 28 via a system bus 29.

The PC 1 may include a mouse and keyboard 25. The controller 101 in FIG. 2 is equivalent to the CPU 21 that performs various kinds of operations in accordance with control programs. The transmitting and receiving unit 102 is equivalent to the network interface 26, and the memory 103 is equivalent to the hard disk drive (HDD) 24. The interface unit 104 is equivalent to the USB interface 28. The display unit 105 is equivalent to the display 27.

The PC 2*a* and the PC 2*b* have the same structure as the PC 1. It should be noted that the PC 2*a* and the PC 2*b* have the mouse and keyboard 25.

Figure 5:
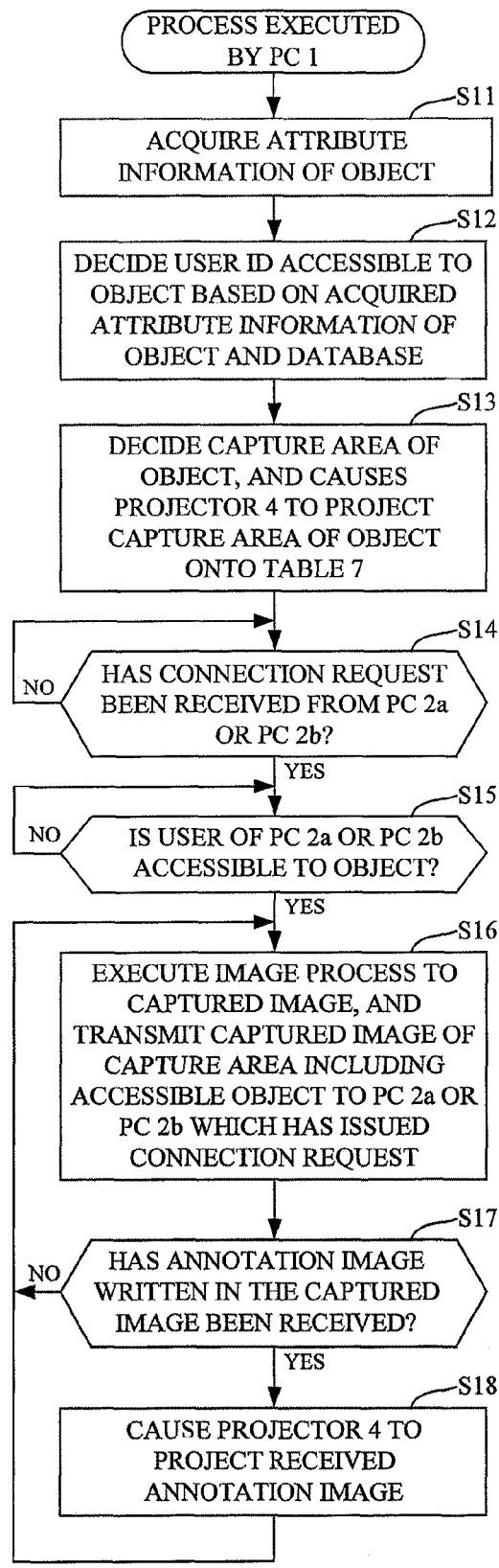
FIG. 5 is a flowchart showing a process executed by the PC 1.

FIG. 5 is a flowchart showing a process executed by the PC 1.

First, the controller 101 of the PC 1 acquires the attribute information of the object (i.e., an ID or a model number of the object) (step S11).

When the input device 6 is a keyboard, the controller 101 of the PC 1 acquires the attribute information of the object to which key thereof is input.

When the input device 6 is the bar-code reader or the RFID reader, the input device 6 reads the bar-code or the RFID tag that has been added to the object, and acquires the attribute information of the object (i.e., the ID or the model number of the object) based on the database in FIG. 3 stored in the memory 103, and information of the read bar-code or the read RFID tag.

When the input device 6 is the RFID reader, plural RFID readers are paved with the table 7. As a result, the controller 101 can grasp the RFID reader which has read the information from the RFID tag attached to the object, and detect an position of the object on the table 7.

Further, the controller 101 compares the image captured by the camera 5 with the template image of the object or the data of CAD included in the database to acquire the attribute information of the object. For example, the controller 101 detects edges of the captured image by using a well-known Canny method, compares the shape of the detected edges with a characteristic of the template image of the object (e.g. the shape of the object), specifies the existence of the object, and then acquires corresponding attribute information from the database.

The controller 101 detects the edges of the captured image by using the well-known Canny method, and compares the shape of the detected edges with the characteristic of the template image of the object (e.g. the shape of the object), so that the controller 101 may determine no existence of the object.

Next, the controller 101 decides a user ID accessible to the object based on the acquired attribute information of the object and the database (step S12).

Next, the controller 101 decides the capture area of the object, and causes the projector 4 to project the capture area of the object onto the table 7 (step S13).

Specifically, with a first method, the controller 101 divides a whole area on the table 7 into plural areas depending on the number of pieces of attribute information acquired in step S11, sets each divided area to the capture area of the object, and causes the projector 4 to project the attribute information and the capture area of the object onto the table 7. For example, when the number of pieces of attribute information acquired in step S11 is two, the controller 101 divides the whole area on the table 7 into two areas, sets one area to the capture area of the object 8, and sets the other area to the capture area of the object 9. Then, the controller 101 causes the projector 4 to project the attribute information and the capture area of the object 8 onto one area of the table 7, and to project the attribute information and the capture area of the object 9 onto the other area of the table 7. According to the first method, when there are plural objects, it is possible to automatically decide the capture area including each object depending on the number of pieces of attribute information of the objects.

With a second method, the controller 101 reads data of a size of the object corresponding to the attribute information acquired in step S11 from the database, decides the capture area of the object in accordance with the size, and causes the projector 4 to project the attribute information and the capture area of the object onto the table 7. When a position of the object deviates from a position of the capture area of the object, a user of the object side moves the object to the position of the capture area of the object. According to the second method, it is possible to automatically decide the capture area in accordance with the size of the object.

With a third method, the controller 101 detects a position of the object on the table 7 based on the image captured by the camera 5, and the template image or the CAD data of the object included in the database, decides the capture area of the object in accordance with the detected position of the object, and causes the projector 4 to project the attribute information and the capture area of the object onto the table 7. The controller 101 detects the edges of the captured image by using the well-known Canny method, and compares the shape of the detected edges with the characteristic of the template image of the object (e.g. the shape of the object), so that the position of the object is detected. According to the third method, it is possible to automatically decide the capture area in accordance with the position of the object.

With a fourth method, the user of the object side puts a sheet with a frame color designating the capture area defined by the database on surroundings of the object. The controller 101 extracts an area enclosed with the sheet with the frame color from the image captured by the camera, based on the frame color designating the capture area defined by the database, decides the extracted area as the capture area of the object, and causes the projector 4 to project the attribute information and the capture area of the object onto the table 7. In this case, the controller 101 causes the projector 4 to project the attribute information of the object corresponding to the frame color onto the table 7, based on the database. According to the fourth method, it is possible to automatically decide the capture area depending on the frame color enclosing the object.

Figure 6:
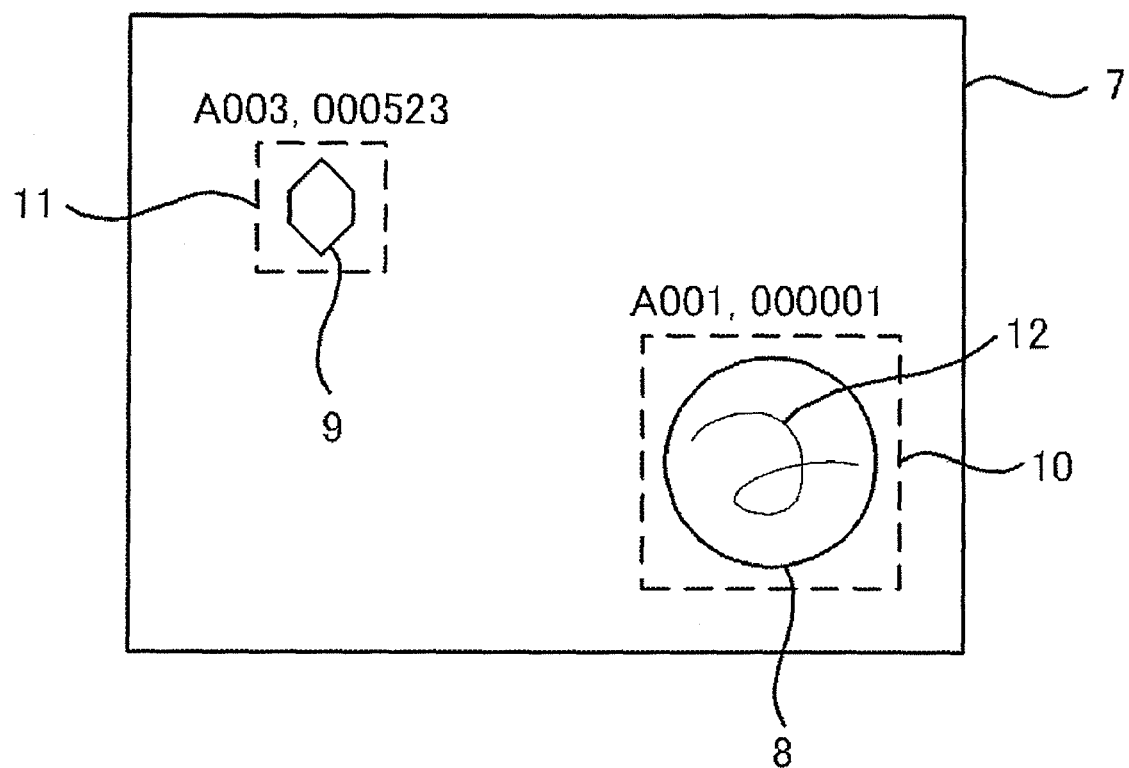
FIG. 6 is a diagram showing a state where attribute information of an object and a capture area is projected.

With the first to fourth methods, the attribute information of the object does not always have to be projected. However, when plural capture areas are projected, it is preferable that the attribute information of the object is projected with each capture area as shown in FIG. 6, in order to prevent the user of the object side from not being able to grasp relationship between each capture area and the object corresponding to it, and being confused. Further, when plural capture areas are projected, each capture area may be separated by color.

Next, the controller 101 determines whether a connection request has been received from the PC 2a or the PC 2b (step S14). In the connection request, a user ID of the user using the PC 2a or the PC 2b is included.

When the answer to the determination of step S14 is "NO", the determination is repeated. On the other hand, when the answer to the determination of step S14 is "YES", the controller 101 determines whether the user of the PC 2a or the PC 2b is accessible to the object (step S15). Specifically, the controller 101 determines whether the user of the PC 2a or the PC 2b is accessible to the object, based on the user ID which is accessible to the object and is decided in step S12, and the user ID included in the connection request.

When the answer to the determination of step S15 is "NO", the determination is repeated. On the other hand, when the answer to the determination of step S15 is "YES", the controller 101 executes an image process to the captured image from the camera 5, and transmits the captured image of the capture area including the accessible object (i.e., the captured image to which the image process is executed) to the PC 2a or the PC 2b which has issued the connection request (step S16).

Figure 7A:
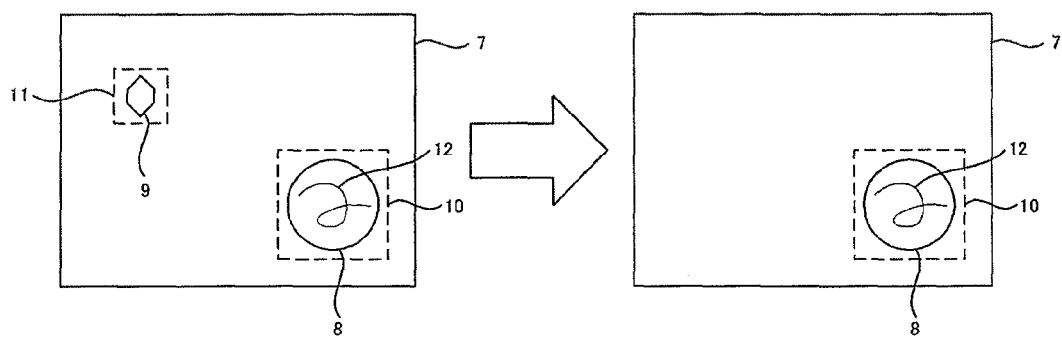
FIGS. 7A and 7B are diagrams useful in explaining an image process executed by a controller 101.
Figure 7B:
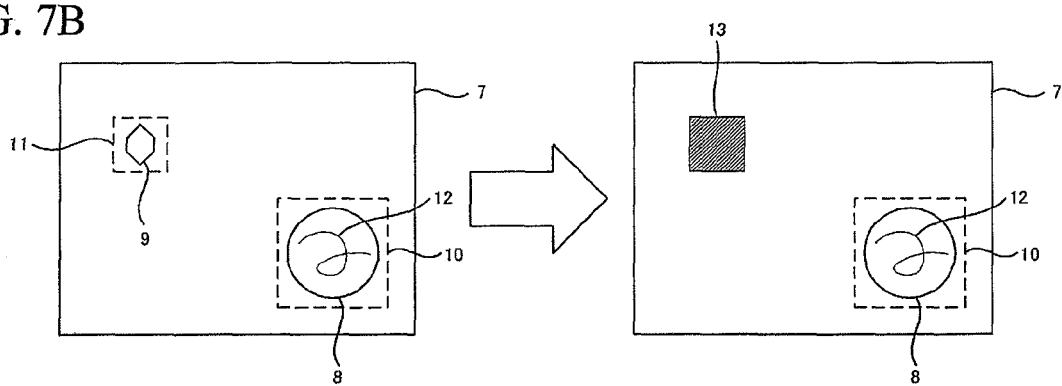

FIGS. 7A and 7B are diagrams useful in explaining the image process executed by the controller 101.

For example, when a PC which has issued the connection request is the PC 2a, and the user of the PC 2a has the right of access to the object 8 and does not have the right of access to the object 9, the controller 101 deletes the object 9 and a capture area 11 thereof from the captured image including the objects 8 and 9, as shown in FIG. 7A. Thus, the captured image which is transmitted to the PC 2a becomes an image at the right side of FIG. 7A.

As shown in FIG. 7B, the controller 101 may form a scramble on the object 9 and a capture area 11 thereof to which the user of the PC 2a does not have the right of access, and paint out the object 9 and a capture area 11 thereof with a black image. Thus, the captured image which is transmitted to the PC 2a becomes an image at the right side of FIG. 7B.

Further, the controller 101 of the PC 1 may transmit a key for scramble release based on data of the user ID included in the database to the PC 2a or the PC 2b beforehand, and then transmit the captured image in which scrambles are formed on all objects to the PC 2a or the PC 2b. In this case, the user of the PC 2a or the PC 2b can cause only the object to which the user has the right of access to be displayed by using the key for the scramble release.

Figure 8:
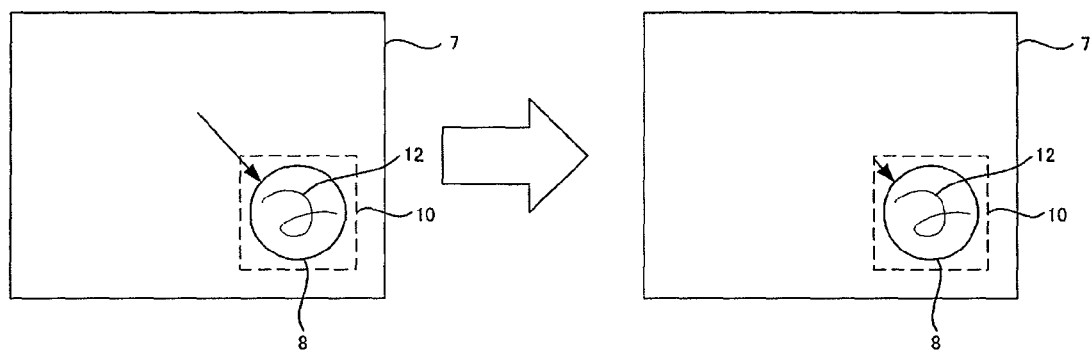
FIG. 8 is a diagram showing a state where a part of an annotation image, which is protruded from the capture area and drawn, is deleted.

Next, the controller 101 determines whether the annotation image written in the captured image has been received from the PC 2a or the PC 2b (step S17). When the answer to the determination of step S17 is "NO", the process returns to step S16. When the answer to the determination of step S17 is "YES", the controller 101 causes the projector 4 to project the received annotation image (step S18), and the process returns to step S16. In step S18, for example, a part of the annotation image (e.g., a part of an arrow) which is protruded from the capture area and drawn is deleted by the image process of the controller 101 as shown in FIG. 8. This makes it possible to prevent the user who does not have the right of access to the object 8 from viewing the annotation image, i.e., prevent leakage of information.

The annotation image projected with the projector 4 in step S18 is transmitted to the PC 1 via the camera 5 as the captured image, and is further transmitted to an remote terminal, which is used by the user having the right of access thereto, other than the PC 2a or the PC 2b. Therefore, users having the right of access can share the annotation image mutually.

As described in detail above, according to the exemplary embodiment, the controller 101 acquires the attribute information of the object, decides the user ID accessible to the object based on the database associated with the attribute information of each object and identification information of the user accessible to each object, and the acquired attribute information of the object, decides the capture area including the object, and causes the projector 4 to project the capture area. Then, the controller 101 determines whether the user of the PC 2a or the PC 2b is accessible to the object based on a user ID from the PC 2a or the PC 2b and the decided user ID. When it is determined that the user of the PC 2a or the PC 2b is accessible to the object, the controller 101 transmits a captured image of the decided capture area to the PC 2a or the PC 2b which has issued the connection request.

The captured image of the capture area including the accessible object is transmitted to the user of the PC 2a or the PC 2b, and it is therefore possible to prevent leakage of information even when plural objects are simultaneously captured. Further, plural users can view simultaneously corresponding plural objects, respectively.

Alternatively, a recording medium having the software program for realizing the functions of the PC 1, the PC 2a, and the PC 2b recorded thereon may be provided to each PC, and the CPU of each PC may read and execute the program recorded on the recording medium. In this manner, the same effects as those of the above described exemplary embodiment can also be achieved. The recording medium for supplying the program may be a CD-ROM, a DVD, a SD card, or the like.

Also, the CPU of each PC may execute the software program for realizing the functions of each PC. In this manner, the same effects as those of the above described exemplary embodiment can also be achieved.

It should be understood that the present invention is not limited to the above described exemplary embodiment, and various modifications may be made to them without departing from the scope of the invention.

What is claimed is:

1. An information processing apparatus that is connected to a projecting device that projects an annotation image transmitted from a remote terminal onto a projection area including an object, and an image capture device that captures the projection area, comprising:
    an acquiring portion that acquires attribute information of the object;
    a deciding portion that decides identification information of a user accessible to the object, based on a database associated with attribute information of each object and identification information of a user accessible to each object, and the acquired attribute information of the object;
    a controlling portion that decides a capture area including the object, and causes the projecting device to project the capture area;
    a determining portion that determines whether a user of the remote terminal is accessible to the object based on identification information of the user from the remote terminal and the identification information of the user decided by the deciding portion; and
    a transmitting portion that transmits a captured image of the decided capture area to the remote terminal when it is determined that the user of the remote terminal is accessible to the object.

2. The information processing apparatus according to claim 1, wherein the controlling portion causes the projecting device to project an annotation image included in the capture area from annotation images transmitted from the remote terminal.

3. The information processing apparatus according to claim 1, wherein the controlling portion causes the projecting device to project the attribute information of the object with the decided capture area.

4. The information processing apparatus according to claim 1, wherein when there are a plurality of objects, the controlling portion divides a whole area capable of being captured by the image capture device into areas depending on the number of pieces of attribute information acquired by the acquiring portion, decides each divided area as the capture area, and causes the projecting device to project the decided capture area.

5. The information processing apparatus according to claim 1, wherein the database further includes data of a size of the object associated with the attribute information of the object, and
    the controlling portion reads data of the size of the object associated with the attribute information of the object from the database, decides the capture area including the object in accordance with the size of the object, and causes the projecting device to project the decided capture area.

6. The information processing apparatus according to claim 1, wherein the database further includes image data or CAD data of the object associated with the attribute information of the object, and
    the controlling portion detects a position of the object based on the image captured by the image capture device and the image data or the CAD data of the object, decides the capture area including the object in accordance with the detected position of the object, and causes the projecting device to project the decided capture area.

7. The information processing apparatus according to claim 1, wherein the database further includes data of a color of a frame enclosing the object, the data being associated with the attribute information of the object, and
    the controlling portion extracts an area enclosed with the color of the frame from the image captured by the image capture device, based on the data of the color of the frame enclosing the object, decides the extracted area as the capture area, and causes the projecting device to project the decided capture area.

8. The information processing apparatus according to claim 1, wherein before the transmitting portion transmits the captured image of the decided capture area to the remote terminal, the transmitting portion executes at least one of a process for deleting a capture area including the object to which the user of the remote terminal is not accessible from the image captured by the image capture device, a process for forming a scramble on the capture area including the object to which the user of the remote terminal is not accessible, and a process for painting out the capture area including the object to which the user of the remote terminal is not accessible with a predetermined color.

9. A remote indication system comprising:
    a projecting device that projects an annotation image transmitted from a remote terminal onto a projection area including an object;
    an image capture device that captures the projection area;
    an information processing apparatus including:
    an acquiring portion that acquires attribute information of the object;
    a deciding portion that decides identification information of a user accessible to the object, based on a database associated with attribute information of each object and identification information of a user accessible to each object, and the acquired attribute information of the object;
    a controlling portion that decides a capture area including the object, and causes the projecting device to project the capture area;
    a determining portion that determines whether a user of the remote terminal is accessible to the object based on identification information of the user from the remote terminal and the identification information of the user decided by the deciding portion; and a transmitting portion that transmits a captured image of the decided capture area to the remote terminal when it is determined that the user of the remote terminal is accessible to the object.

10. A computer readable recording medium causing a computer to execute a process, the computer being connected to a projecting device that projects an annotation image transmitted from a remote terminal onto a projection area including an object, and an image capture device that captures the projection area, the process comprising:

acquiring attribute information of the object;

deciding identification information of a user accessible to the object, based on a database associated with attribute information of each object and identification information of a user accessible to each object, and the acquired attribute information of the object;

deciding a capture area including the object, and causing the projecting device to project the capture area;

determining whether a user of the remote terminal is accessible to the object based on identification information of the user from the remote terminal and the decided identification information of the user; and transmitting a captured image of the decided capture area to the remote terminal when it is determined that the user of the remote terminal is accessible to the object.

\* \* \* \* \*